United States Patent [19]

Ijuin et al.

[11] Patent Number: 5,014,135
[45] Date of Patent: May 7, 1991

[54] FACSIMILE APPARATUS HAVING A THERMAL IMAGE RECORDING HEAD RETRACTABLE FROM A RECORDING POSITION

[75] Inventors: Kazuya Ijuin, Tokyo; Shinnichiro Otsuki, Yokohama; Yuji Nakano, Yokosuka; Hiroshi Ogushi, Tokyo, all of Japan

[73] Assignee: Canon Kabushiki Kaisha, Tokyo, Japan

[21] Appl. No.: 547,335

[22] Filed: Jul. 5, 1990

Related U.S. Application Data

[63] Continuation of Ser. No. 201,163, Jun. 2, 1988, abandoned.

[30] Foreign Application Priority Data

Jun. 12, 1987 [JP] Japan .................................. 62-89676
Jun. 12, 1987 [JP] Japan ................................ 62-145200

[51] Int. Cl.⁵ .......................... H04N 1/23; B41J 2/32; G01D 15/10
[52] U.S. Cl. .................................. 358/296; 346/76 PH
[58] Field of Search .......................... 346/136, 76 PH; 400/120; 358/296, 498

[56] References Cited

U.S. PATENT DOCUMENTS 4,088,214 5/1978 Shindo ...................... 346/76 PH
4,421,428 12/1983 Noda et al. ...................... 400/120
4,536,772 8/1985 Isogai ...................... 346/76 PH

FOREIGN PATENT DOCUMENTS 52-15283 4/1977 Japan .
54-51615 4/1979 Japan .
56-03173 1/1981 Japan .

Primary Examiner—Benjamin R. Fuller
Assistant Examiner—Scott A. Rogers
Attorney, Agent, or Firm—Fitzpatrick, Cella, Harper & Scinto

[57] ABSTRACT

There is provided an image recording apparatus to record an image onto a recording sheet in a facsimile apparatus or the like. This recording apparatus comprises: a recording head for recording an image onto the recording sheet; a rotary platen roller for conveying the recording sheet; a guide member for guiding the recording sheet along the peripheral surface of the platen roller; and a device to rotatably support the guide member around the rotary shaft of the platen roller as a rotational center. The recording head is arranged so as to be come into pressure contact with the peripheral surface of the platen roller. A pair of cam members for separating the recording head away from the platen roller are attached integrally with the guide member. With this apparatus, even if the sheet holder and platen roller are closely located, the recording sheet can be easily inserted into the gap therebetween. The apparatus can be miniaturized.

36 Claims, 5 Drawing Sheets

FACSIMILE APPARATUS HAVING A THERMAL IMAGE RECORDING HEAD RETRACTABLE FROM A RECORDING POSITION

This application is a continuation of application Ser. No. 201,163 filed June 2, 1988 now abandoned.

BACKGROUND OF THE INVENTION

1. Field of the Invention

The present invention relates to an image recording apparatus for recording an image onto a sheet and, more particularly, to an image recording apparatus in which the attaching performance of, e.g., a recording sheet wound like a roll can be improved..

The image recording apparatuses include facsimile apparatus, a printer apparatus, a copying apparatus, and the like.

2. Related Background Art

An example of a facsimile apparatus will now be described hereinbelow as an image recording apparatus.

According to a recording system in a general facsimile apparatus or the like, a thermal paper which thermally generates a color is wound like a roll and attached to a holder. This thermal paper is conveyed by a platen roller. A recording head which is brought into pressure contact with the platen roller through the thermal paper is heated in accordance with an image signal, thereby recording an image.

In the current facsimile apparatus or the like, miniaturization of the apparatus is required. To meet this requirement, it is necessary to reduce as short as possible the distance between a holder and the recording section consisting of the platen roller and recording head.

However, in the facsimile apparatus or the like with the foregoing structure, when the thermal paper is set, it is necessary to pinch the thermal paper set to the holder and to insert the front edge of the paper into the space between the platen roller and the recording head. For this purpose, it is necessary to keep a space large enough to insert the hand of the operator between the holder and the recording section. Such a space becomes an obstacle to miniaturize the apparatus.

Further, in the case of setting thermal paper in such a facsimile apparatus or the like, it is necessary to separate the recording head from the platen roller and to insert the front edge of the thermal paper into the space between the recording head and the platen roller As a separating mechanism for this purpose, a cam which abuts the recording head is provided and this cam is rotated around the cam shaft as a rotational center.

However, in the facsimile apparatus with such a structure, the shaft and space to attach the cam are needed and at the same time, it is difficult to accurately set the separation distance between the recording head and the platen roller.

SUMMARY OF THE INVENTION

It is an object of the present invention to provide an image recording apparatus in which the main body is miniaturized.

Another object of the invention is to provide an image recording apparatus which can easily attach a roll-shaped recording sheet.

Still another object of the invention is to provide an image recording apparatus having a guide mechanism of a recording sheet in which the recording sheet can be easily set.

Still another object of the invention is to provide an image recording apparatus in which when a recording sheet is set to the apparatus main body, a recording head can be separated from a platen.

Still another object of the invention is to provide an image recording apparatus in which the number of parts can be reduced.

Still another object of the invention is to provide an image recording apparatus having a guide mechanism for a recording sheet in which, even if the foregoing space does not exist, the recording sheet can be easily set.

DETAILED DESCRIPTION OF THE PREFERRED EMBODIMENT

An embodiment, which will be explained hereinafter, relates to a facsimile apparatus comprising a rotary member for conveying a sheet material and a guide member for guiding the sheet material along the peripheral surface of the rotary member, wherein the guide member can be rotated around the rotary shaft of the rotary member as a rotational center.

According to the facsimile apparatus, when the guide member is rotated along the peripheral surface of the rotary member and, for example, the edge portion of the guide member and the upper end surface of the rotary member are substantially made coincident, the sheet material can be inserted into the gap between the guide member and the rotary member from the top of the apparatus and the front edge of the sheet material can be also easily set to a predetermined position.

On the other hand, an embodiment, which will be further explained hereinlater, relates to a facsimile apparatus comprising a rotary member to convey a sheet material which is rotatable around a rotary shaft as a rotational center, a recording head which is energized to the rotary member and can genrrate the heat in accordance with an image signal, and a cam member to separate the recording head from the rotary member, wherein the cam member is attached so as to be rotatable around the rotary shaft of the rotary member.

According to this facsimile apparatus, since the rotary shaft of the rotary member also functions as an attaching shaft of the cam member, the number of parts can be reduced and the space can be reduced. In addition, the distance from the center of the rotary member to the projecting portion of the cam member can be also easily set.

An embodiment in which the invention is applied to a facsimile apparatus will now be explained.

Figure 1:
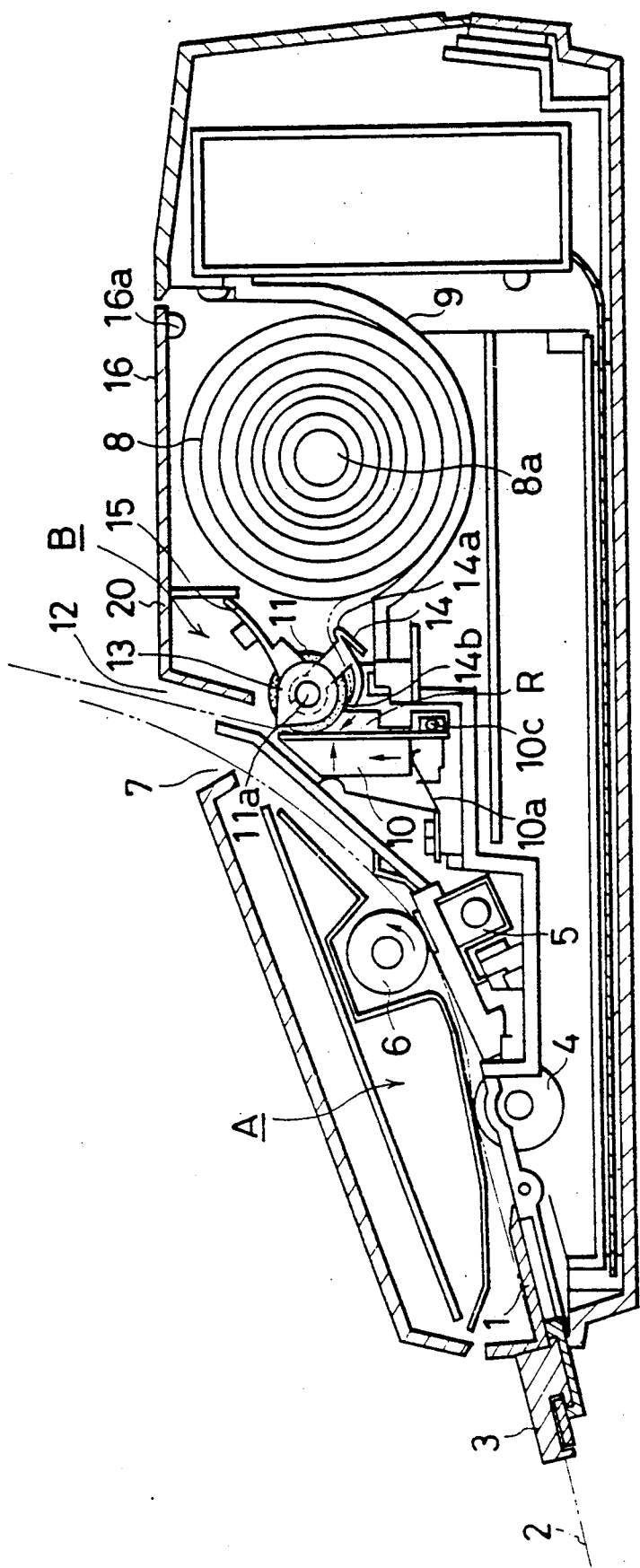
FIG. 1 is a cross sectional explanatory diagram of a facsimile apparatus to which an embodiment of the present invention is applied.
Figure 2:
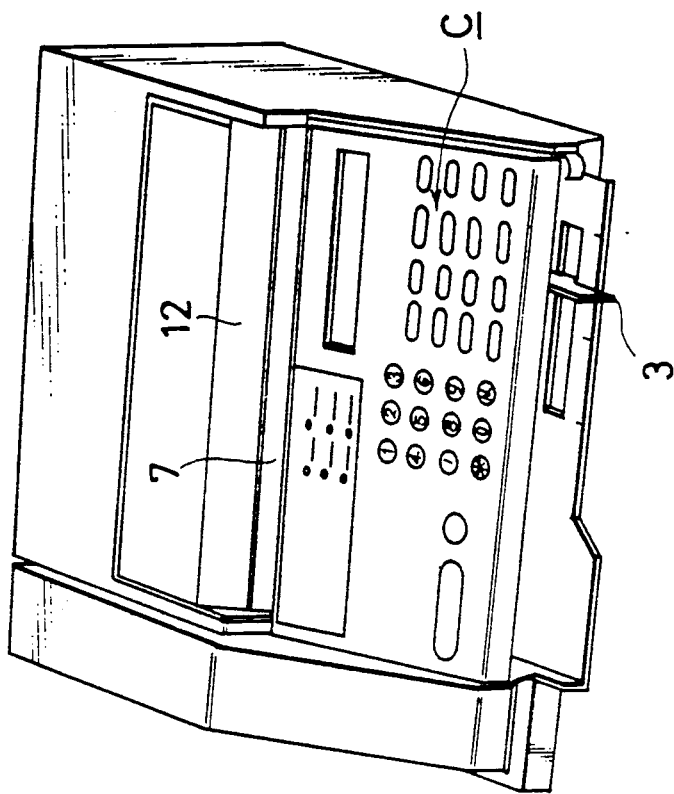
FIG. 2 is a perspective explanatory diagram of FIG. 1.

FIG. 1 is a cross sectional explanatory diagram of the facsimile apparatus according to the embodiment. FIG. 2 is a perspective explanatory diagram of FIG. 1.

First, the outline of the whole structure will be explained. In the diagrams, A denotes an original conveyance reading system. A plurality of sheet-shaped originals 2 are put on an original setting base 1 such that the surfaces of the originals face the base 1. Both ends of the originals are guided by a sheet guide member 3 and are separated one by one by a separating feed roller 4 and fed to the reading system. The originals 2 fed are conveyed at a constant speed by the rotation of a conveying roller 6 onto which a reading sensor (what is called a contact type sensor, equivalent magnification sensor, or the like) 5. During this conveyance, the information on the surface of the original is read by the read sensor 5. After the image information of the original 2 was read by the sensor 5, the original 2 is ejected upward from an ejecting port 7. In the case of the facsimile mode, the image information read by the sensor 5 is transmitted to the recording system of another facsimile apparatus. In the copy mode, the image information is transmitted to its own recording system, which will be explained hereinafter.

On the other hand, B indicates a recording system. A recording sheet 8 consisting of a thermal sheet wound like a roll around a winding core 8a is detachably set to a roll holder 9. The recording sheet 8 is conveyed at a constant speed by the rotation of a platen roller 11. Further, a thermal head 10 having a plurality of heat generating elements is brought come into pressure contact with the platen roller 11. When the head 10 generates heat in accordance with the image signal as the recording sheet 8 is conveyed through the gap between the platen roller 11 and the thermal head 10, a predetermined image is recorded on the recording sheet 8. After the image is recorded, the recording sheet 8 is ejected upward from an ejecting port 12.

In FIG. 2, C represents an operating section to make the apparatus operative and a display section of the operation.

The guide mechanism to set the recording sheet 8 to the recording section will now be described.

Figure 3:
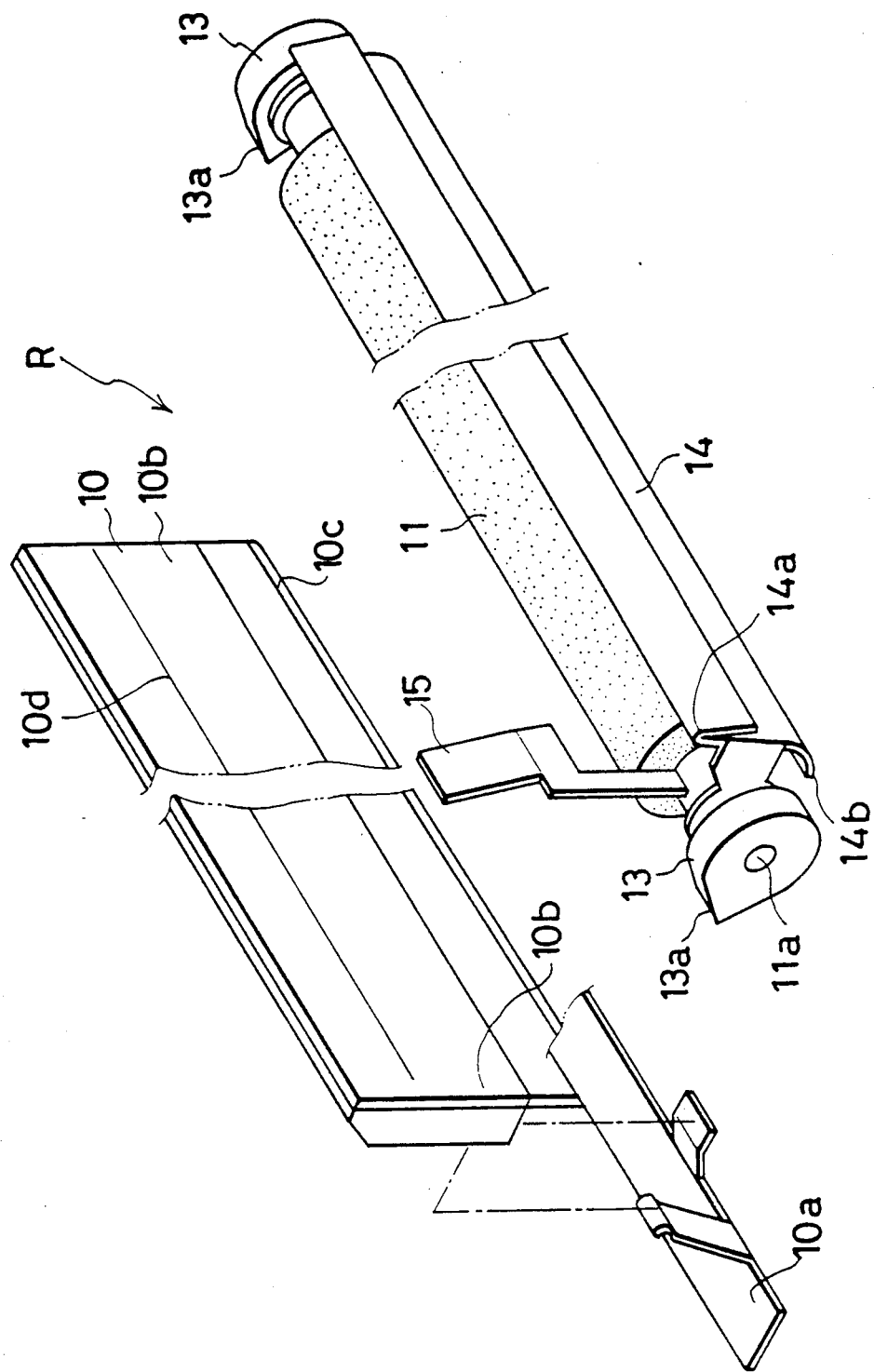
FIG. 3 is an exploded explanatory diagram of a recording section.

FIG. 3 is an exploded explanatory diagram of a recording section R. In the recording section R, the long thermal head 10 is attached to the peripheral surface of the platen roller 11 by a leaf spring 10a in a manner such that the portion 10d on which a plurality of heat generating elements are attached are come into pressure contact in a line with the peripheral surface of the platen roller 11. The platen roller 11 is driven by a motor (not shown) coupled with a rotary shaft 11a.

Further, cam members 13 connected integrally with the bearing of the rotary shaft 11a are attached to both sides of the platen roller 11 so as to be rotatable around the rotary shaft 11a as a rotational center. The cam members 13 can abut on the thermal head 10 at both end portions 10b thereof. When the cam members rotate counterclockwise, cam portions 13a abut thermal head 10 at both end portions 10b, thereby pushing the thermal head 10 upward and counterclockwise against, the pressing force of the spring 10a. Thus, the thermal head 10 is separated from the platen roller 11. The thermal head 10 is rotatable around a shaft 10c as a rotational center.

A guide member 14 is arranged so as to keep a predetermined interval from the peripheral surface of the platen roller 11. The guide member 14 is used to guide the recording sheet 8 along the peripheral surface of the platen roller 11. Both ends in the longitudinal direction of the guide member 14 are fixed to the cam members 13 and rotate integrally therewith, respectively.

Further, a knob portion 15 is integrally formed on one of the cam members 13. The knob portion 15 has such a length as to be projected upward from an upper frame 20 of the apparatus main body when the knob portion 15 is rotated in the standing state as shown in FIG. 4.

The case of setting the recording sheet 8 to the recording section R with the foregoing structure will now be described.

Figure 4:
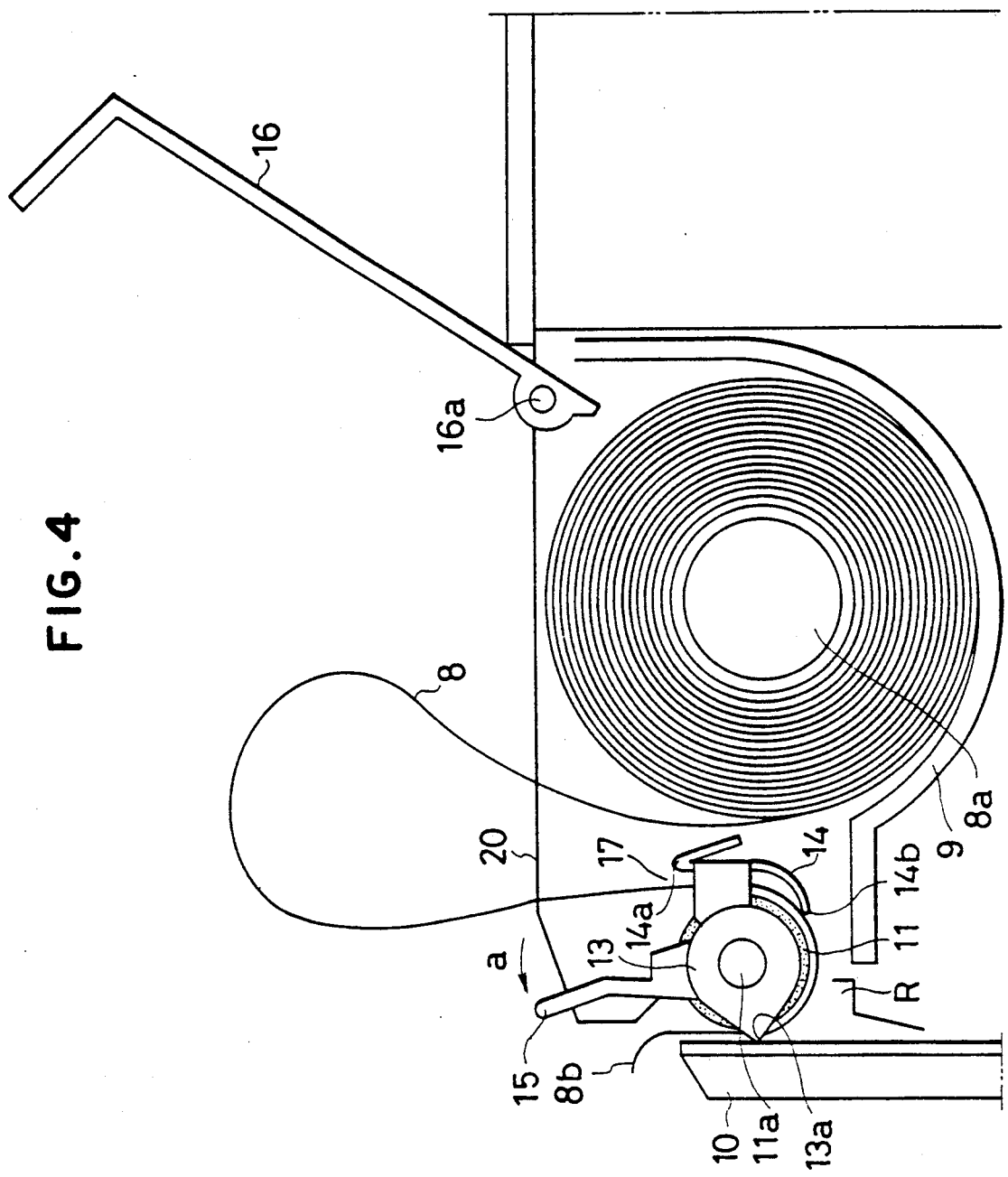
FIGS. 4 and 5 are explanatory diagrams in the case of setting a recording sheet.

As shown in FIG. 4, a lid 16 of the recording system B is rotated clockwise around its axis 16a as a rotational center and is opened. The knob portion 15 is rotated counterclockwise (in the direction indicated by an arrow a). At this time, the thermal head 10 is away from the peripheral surface of the platen roller 11 by the rotation of the cam member 13 which rotates integrally with the knob portion 15. The guide member 14 also rotates and moves upward. As shown in FIG. 4, an upper end 14a of the guide member 14 ascends to the height which is almost the same as the upper end surface of the platen roller 11, thereby forming an inserting port 17 of the recording sheet 8.

The upper end portion 14 a of the guide member 14a is bent outwardly and forms an arc-shape. On the other hand, a lower end portion 14b is bent inwardly. For the guide member 14, in the case of setting the recording sheet 8 shown in FIG. 4, the upper end portion 14a is largely away from the peripheral surface of the platen roller 11 and the lower end portion 14b is close to the peripheral surface of the platen roller 11. Therefore, when the recording sheet 8 is set to the sheet holder 9, the operator can easily lead a front edge 8b of the roll-shaped recording sheet 8 set to the sheet holder 9 toward the inserting port formed by the guide member 14. Further, the front edge 8b can be certainly inserted along the peripheral surface of the platen roller 11.

In other words, when the recording sheet 8 wound like a roll is put down into the sheet holder 9 in this state and the front edge 8b is inserted into the inserting portion 17, the recording sheet 8 is guided by the guide member 14 and inserted into the gap between the platen roller 11 and the recording head 10 which is away from the platen roller.

When the recording sheet 8 is inserted to the inserting port 17, the upper end portion 14a of the guide member 14 and the upper end surface of the platen roller 11 are located at almost the same height, so that the inserting port 17 is accessible substantially directly overhead. Therefore, the front edge of the recording sheet 8 can be inserted from almost the directly overhead position. Consequently, when the recording sheet 8 is set, the operator doesn't need to insert the head into the gap between the recording section R and the holder 9. Therefore, the space between them can be fairly reduced.

On the other hand, since the cam members 13 rotate around the rotary shaft 11a of the platen roller 11, the separation distance between the thermal head 10 and the peripheral surface of the platen roller 11 can be accurately set.

Further, even if the operator tries to make the recording system B operative in the foregoing state, the knob portion 15 is projected upward from the upper frame 20 of the apparatus main body and the lid 16 cannot be perfectly closed. Thus, the malfunction in this state is prevented.

Figure 5:
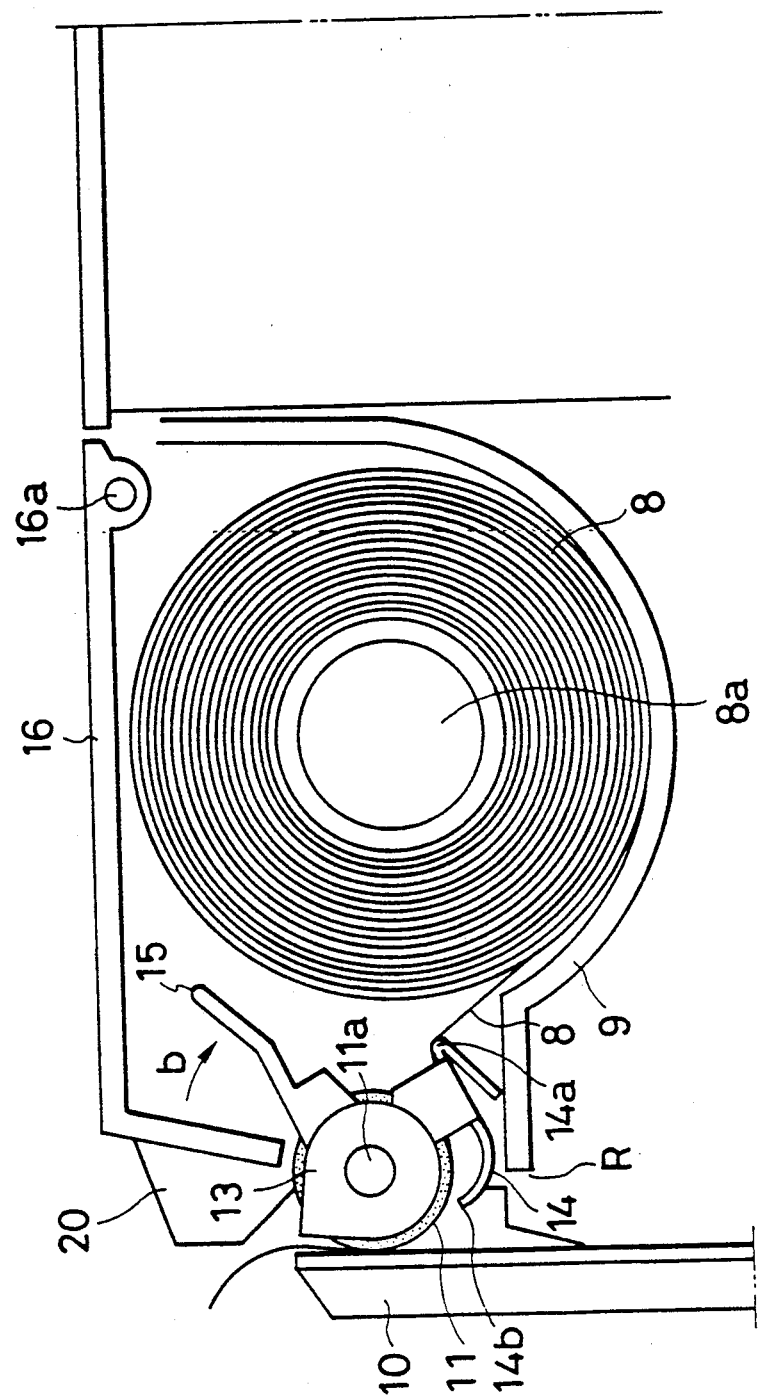

After the front edge 8b of the recording sheet 8 was inserted into the space between the thermal head 10 and the platen roller 11, if the knob portion 15 is manually rotated counterclockwise (in the direction of an arrow b) as shown in FIG. 5, the cam members 13 also rotate counterclockwise and the thermal head 10 is brought into pressure contact with the peripheral surface of the platen roller 11 through the recording sheet 8 by the elastic force of the spring 10a. At this time, the guide member 14 also rotates in association with the rotation of the cam members 13 and descends into the apparatus and stops at predetermined position along the peripheral surface of the platen roller 11. The knob portion 15 is also fitted at a predetermined position in the apparatus main body.

In this manner, the recording sheet 8 is set. After that, it is sufficient to close the lid 16 and to start the recording operation. After the recording sheet 8 was set, since the guide member 14 has already descended in the apparatus as mentioned above, the recording sheet 8 is prevented from unnecessarily bent in the opposite direction in the edge portion of the guide member 14 as shown in FIG. 5.

It is sufficient that the cam members 13 have such shapes that when they are rotated, the distance from the rotational center to the outer periphery which comes into contact with the opposite member continuously changes.

On the other hand, when the recording sheet 8 is set, it is sufficient that at least the recording head 10 and platen roller 11 are away from each other. The guide member 14 is not always necessary.

In addition, although the embodiment has been described with respect to the example in which the cam members 13 and guide member 14 are integrally constricted, they can be separately formed. Further, in the foregoing embodiment, the example of the thermal head has been shown as a recording head. However, the invention is not limited to the thermal head. For example, an ink jet head or the like can be also used. Moreover, the platen is not limited to the roller shown in the foregoing embodiment but may be a flat plate shaped member. An endless belt attached to pulleys or the like can be also used.

As mentioned above, according to the embodiment, the guide member can be rotated along the peripheral surface of the rotary member to convey the sheet. Accordingly, for example, even if the holder to enclose the sheet wound like a roll and the rotary member are closely located, the sheet can be easily set. In the case of applying the embodiment to a facsimile apparatus or the like, there is an advantage such that the apparatus can be miniaturized or the like.

As mentioned above, according to the present invention, it is possible to provide an image recording apparatus which can miniaturize the apparatus main body.

We claim:

1. An image recording apparatus for recording an image onto a medium to be recorded, comprising:
    a recording head for recording the image onto said medium to be recorded, said recording head moveable between a recording position for recording and a retracted position retracted from said recording position;
    a rotary member for conveying the medium to be recorded;
    a guide member for guiding the medium to be recorded along the peripheral surface of said rotary member;
    means for supporting said guide member in such a manner that said guide member is movable between an inserting position for inserting said recording medium by hand between said rotary member and said guide member and a guiding position for guiding said recording medium to record; and
    means for displacing the recording head and the guide member in cooperation.

2. An apparatus according to claim 1, wherein said recording head is attached so as to be come into pressure contact with said rotary member, and cam members for separating said recording head away from said rotary member is attached integrally with said guide member.

3. An apparatus according to claim 1, wherein a lever to manually operate said guide member is formed integrally with the guide member.

4. An apparatus according to claim 2, wherein a lever to manually operate said guide member is formed integrally with the guide member.

5. An image recording apparatus for recording an image onto a medium to be recorded, comprising:
    a recording head for recording the image onto said medium to be recorded;
    a rotary member for conveying the medium to be recorded, wherein said rotary member is a platen roller in a facsimile apparatus;
    a guide member for guiding the medium to be recorded along the peripheral surface of said rotary member; and
    means for rotatably supporting said guide member around the rotary shaft of the rotary member.

6. An image recording apparatus for recording an image onto a medium to be recorded, comprising:
    a recording head for recording the image onto said medium to be recorded;
    a rotary member for conveying the medium to be recorded,
    wherein said rotary member is a platen roller in a facsimile apparatus and said recording head is attached so as to come into pressure contact with said rotary member, and cam members for separating said recording head away from said rotary member is attached integrally with said guide member;
    a guide member for guiding the medium to be recorded along the peripheral surface of said rotary member; and
    means for rotatably supporting said guide member around the rotary shaft of the rotary member.

7. An image recording apparatus for recording an image onto a medium to be recorded, comprising:
    a rotary member for conveying said medium to be recorded, said rotary member being rotatable around its rotary shaft as a rotational center;
    a thermal head which is energized so as to press said rotary member and can generate a heat in accordance with an image signal; and
    a separating member, rotatably arranged around the rotary shaft of the rotary member as a rotational center, for separating said recording head away from the rotary member.

8. An apparatus according to claim 7, wherein said separating member is a cam member.

9. An apparatus according to claim 8, wherein said cam member is formed integrally with the bearing of said rotary shaft.

10. An apparatus according to claim 7, wherein said rotary member is a platen roller in a facsimile apparatus.

11. An apparatus according to claim 7, wherein a lever to manually operate said separating member is formed integrally with said separating member.

12. An image recording apparatus for recording an image onto a medium to be recorded, comprising:
- a rotary member which is arranged so as to be rotatable around its rotary shaft as a rotational center and conveys the medium to be recorded;
- a thermal head which is energized so as to press the rotary member and can generate a heat in accordance with an image signal;
- a guide member for guiding the medium to be recorded along the peripheral surface of said rotary member; and
- a cam member, arranged so as to be rotatable around the rotary shaft of the rotary member as a rotational center, for separating said thermal head from the rotary member and for rotating the guide member around the rotary shaft of the rotary member as a rotational center.

13. An image recording apparatus according to claim 1, wherein an upper end of said guide member locates at a substantially same level as an upper and of said rotary member at said inserting position.

14. An image recording apparatus according to claim 1, wherein said guide member has an arcuated upper end bending outwardly and an inwardly bowed lower end.

15. An image recording apparatus according to claim 1, wherein an upper end of said guide member is greatly spaced apart from the circumference of said rotary member and a lower end of said guide member is close to the circumference of said rotary member.

16. An image recording apparatus for recording an image on a recording medium, said apparatus comprising;
- a recording head for recording an image on a recording medium, said recording head being displaceable between a recording position for recording and a retracted position retracted from said recording position;
- a rotary member for conveying said recording medium;
- a guide member for guiding said recording medium along the peripheral surface of said rotary member, said guide member being displaceable between a guiding position for guiding said recording medium along the peripheral surface of said rotary member and a retracting position retracted from said guiding position; and
- displacing means for displacing said recording head and said guide member in cooperation.

17. An image recording apparatus according to claim 16, wherein said displacing means is also for manually displacing said recording head and said guide member.

18. An image recording apparatus according to claim 16, wherein said displacing means has a cam rotatable around an axis of said rotary member.

19. An image recording apparatus according to claims 16, wherein at said retracting position an upper end of said guide member is located at substantially the same level as an upper end of the peripheral surface of said rotary member.

20. An image recording apparatus according to claim 16, wherein an upper end of said guide member has an arcuated shape bending outwardly and an inner end of said guide member is arcuated inwardly.

21. An image recording apparatus according to claim 16, wherein at said retracting position an upper end of said guide member is spaced apart from the peripheral surface of said rotary member and an inner end of said guide member is close to the peripheral surface of said rotary member.

22. An image recording apparatus as in claim 1, wherein said recording head includes a thermal head having a plurality of heat generating elements.

23. An image recording apparatus as in claim 1, wherein said recording head includes an ink jet recording head.

24. An image recording apparatus as in claim 1, wherein said recording head includes a full-line type recording head.

25. An image recording apparatus in claim 5, wherein said recording head includes a thermal head having a plurality of heat generating elements.

26. An image recording apparatus as in claim 5, wherein said recording head includes an ink jet recording head.

27. An image recording apparatus as in claim 5, wherein said recording head includes a full-line type recording head.

28. An image recording apparatus as in claim 6, wherein said recording head includes a thermal head having a plurality of heat generating elements.

29. An image recording apparatus as in claim 6, wherein said recording head includes an ink jet recording head.

30. An image recording apparatus as in claim 6, wherein said recording head includes a full-line type record head.

31. An image recording apparatus as in claim 12, wherein said recording head includes a thermal head having a plurality of heat generating elements.

32. An image recording apparatus as in claim 12, wherein said recording head includes an ink jet recording head.

33. An image recording apparatus as in claim 12, wherein said recording head includes a full-line type record head.

34. An image recording apparatus as in claim 16, wherein said recording heat includes a thermal head having a plurality of heat generating elements.

35. An image recording apparatus as in claim 16, wherein said recording head includes an ink jet recording head.

36. An image recording apparatus as in claim 16, wherein said recording head includes a full-line type recording head.

* * * * *

UNITED STATES PATENT AND TRADEMARK OFFICE
CERTIFICATE OF CORRECTION

PATENT NO. : 5,014,135
DATED : May 7, 1991
INVENTOR(S) : KAZUYA IJUIN, ET AL.

It is certified that error appears in the above-identified patent and that said Letters Patent is hereby corrected as shown below:

Title Page:

AT [30] FOREIGN APPLICATION PRIORITY DATA

"Jun. 12, 1987 [JP] Japan .... 62-89676" should read --Jun. 12, 1987 [JP] Japan .... 62-89676[U]--.

COLUMN 1

Line 49, "roller As" should read --roller. As--.

COLUMN 2

Line 17, "cross sectional" should read --cross-sectional--.
Line 50, "genrrate" should read --generate--.
Line 64, "cross sectional" should read --cross-sectional--.

COLUMN 3

Line 8, "onto which" should read --having--.
Line 12, "was" should read --is--.
Line 26, "come" should be deleted.
Line 45, "are come" should read --comes--.
Line 54, "thereof When" should read --thereof. When--.
Line 57, "against," should read --against--.

UNITED STATES PATENT AND TRADEMARK OFFICE
CERTIFICATE OF CORRECTION

PATENT NO. : 5,014,135
DATED : May 7, 1991
INVENTOR(S) : KAZUYA IJUIN, ET AL.

It is certified that error appears in the above-identified patent and that said Letters Patent is hereby corrected as shown below:

COLUMN 4

Line 23, "guide member 14a" should read --guide member 14--.
Line 44, "to" should read --into--.
Line 48, "accessible substantially" should read --accessible from substantially--.
Line 52, "doesn't" should read --does not--.

COLUMN 5

Line 10, "at predetermined" should read --at the predetermined--.
Line 17, "in" should read --into--.
Line 19, "bent" should read --being bent--.
Line 34, "stricted," should read --structed,--.
Line 40, "plate shaped" should read --plate-shaped--.
Line 60, "move-" should read --mov- --.

COLUMN 6

Line 11, "be" should be deleted.
Lines 14 and 45, "is" should read --are--.

COLUMN 7

Line 25, "upper and" should read --upper end--.
Line 39, "ing;" should read --ing:--.

UNITED STATES PATENT AND TRADEMARK OFFICE
CERTIFICATE OF CORRECTION

PATENT NO. : 5,014,135

DATED : May 7, 1991

INVENTOR(S) : KAZUYA IJUIN, ET AL.

It is certified that error appears in the above-identified patent and that said Letters Patent is hereby corrected as shown below:

COLUMN 8

Line 2, "claims 16," should read --claim 16,--.
Line 25, "apparatus in" should read
--apparatus as in--.
Lines 42 and 51 "record head." should read
--recording head.--.

Signed and Sealed this

Eighth Day of December, 1992

Attest:

DOUGLAS B. COMER

*Attesting Officer*     *Acting Commissioner of Patents and Trademarks*